(12) United States Patent  (10) Patent No.: US 9,178,397 B2
Furuhashi et al.  (45) Date of Patent: Nov. 3, 2015

(54) BRUSHLESS MOTOR WITH CROSSING WIRE HOLDER

(71) Applicant: DENSO CORPORATION, Kariya, Aichi-pref. (JP)

(72) Inventors: Daiji Furuhashi, Anjo (JP); Kiyoshi Nagata, Nagoya (JP); Masaya Ootake, Okazaki (JP)

(73) Assignee: DENSO CORPORATION, Kariya (JP)

( * ) Notice: Subject to any disclaimer, the term of this patent is extended or adjusted under 35 U.S.C. 154(b) by 417 days.

(21) Appl. No.: 13/689,994

(22) Filed: Nov. 30, 2012

(65) Prior Publication Data

US 2013/0162098 A1 Jun. 27, 2013

(30) Foreign Application Priority Data

Dec. 21, 2011 (JP) ................. 2011-279601

(51) Int. Cl.
H02K 3/38 (2006.01)
H02K 3/52 (2006.01)
H02K 5/12 (2006.01)

(52) U.S. Cl.
CPC .................. *H02K 3/38* (2013.01); *H02K 3/522* (2013.01); *H02K 5/12* (2013.01); *H02K 2203/06* (2013.01)

(58) Field of Classification Search
CPC .............. H02K 3/38; H02K 3/32; H02K 3/50
USPC ........................................... 310/215, 71, 260
See application file for complete search history.

(56) References Cited

U.S. PATENT DOCUMENTS

2007/0103014 A1*  5/2007  Sumiya et al. ................. 310/71
2007/0182265 A1   8/2007  Makino et al.
2011/0215662 A1*  9/2011  Lee et al. ....................... 310/71

* cited by examiner

*Primary Examiner* — Michael Andrews
(74) *Attorney, Agent, or Firm* — Nixon & Vanderhye P.C.

(57) ABSTRACT

A motor part of a fuel pump is a brushless motor having a stator and a rotor. The stator has a core, a coil set and an insulator, which holds the core and the coil set in an insulated manner. The coil set has a plurality of coils wound about a tooth part and a plurality of crossing wires connecting the coils. The insulator is formed by stacking central ring parts of a plurality of stator units in an axial direction. At least one of crossing wire holder parts is formed of a combination of guide projections, which are formed on the different central ring parts. The length of the brushless motor in the axial direction can thus be shortened.

5 Claims, 13 Drawing Sheets

FIG. 13A
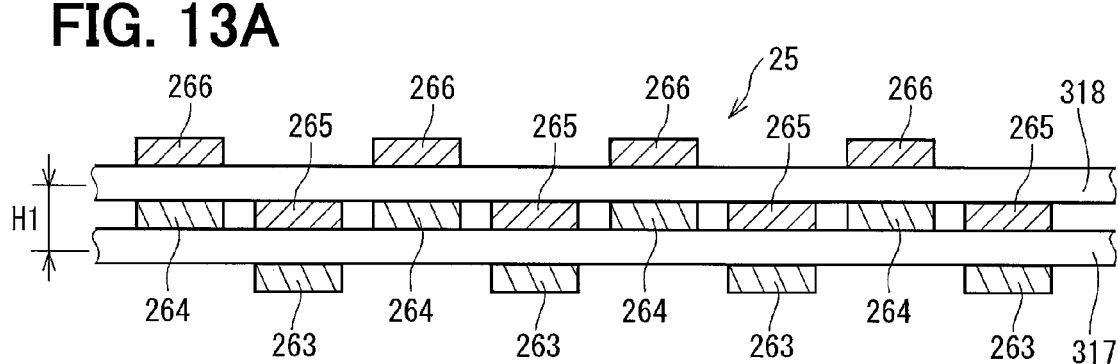
FIG. 13B
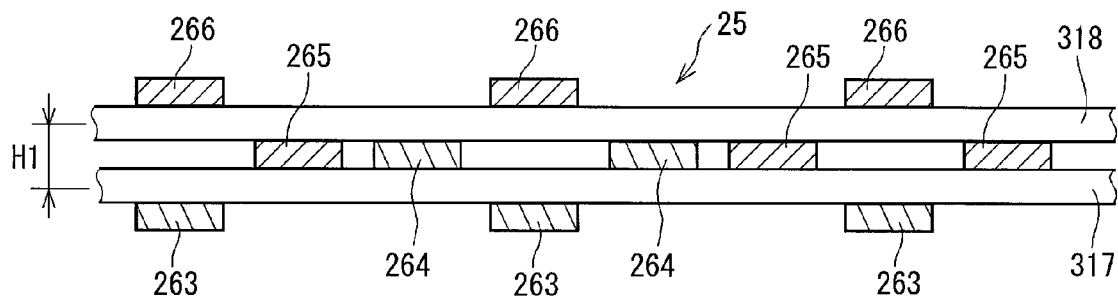
FIG. 13C  COMPARATIVE EXAMPLE
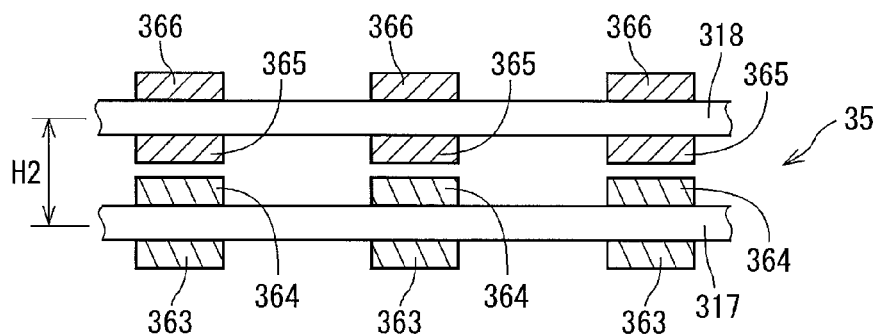
FIG. 13D  COMPARATIVE EXAMPLE
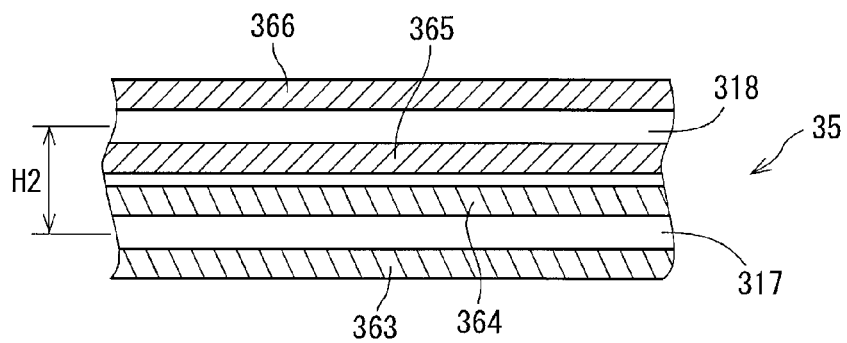

US 9,178,397 B2

BRUSHLESS MOTOR WITH CROSSING WIRE HOLDER

CROSS REFERENCE TO RELATED APPLICATION

This application relates to and incorporates herein by reference Japanese patent application No. 2011-279601 filed on Dec. 21, 2011.

TECHNICAL FIELD

The present disclosure relates to a brushless motor.

BACKGROUND ART

According to a conventional brushless motor, current supply to a coil set wound about a core of a stator is controlled to continuously switch over magnetic field so that a rotor provided inside the stator is rotated. A coil wire wound about one of a plurality of core parts, which forms the core, and a coil wire wound about another core part are connected by crossing wires. Holder parts for holding the crossing wires are formed on the stator.

For example, in JP 2007-129847A (US 2007/0103014 A1), a positioning member including a plurality of projections arranged in a radial direction is formed. Each crossing wire is laid between the adjacently arranged projections of the positioning member so that the plurality of crossing wires is juxtaposed and held in the radial direction.

The positioning member is formed in a step shape and the plurality of crossing wires is held while being shifted in position in an axial direction. The holder part thus becomes long in the axial direction. The plurality of crossing wires is only pushed in between the adjacently arranged projections. No configuration is provided to prevent the crossing wires from dropping out. The crossing wires thus tend to drop out from the positioning member due to, for example, injection pressure, applied to resin-mold the crossing wires at a later manufacturing step. As a result, dropout of the crossing wires causes various flaws such as damage and short-circuit.

SUMMARY

It is therefore an object to provide a brushless motor, which is short in an axial direction while having a crossing wire holder member on a stator.

It is another object to provide a brushless motor, which prevents crossing wires from dropping out from a crossing wire holder part.

A brushless motor is formed of a stator and a rotor. The stator includes a core formed with a plurality of tooth parts arranged in a circumferential direction, a coil set wound on the core, and an insulator holding the core and the coil set while providing insulation therebetween. The stator generates a rotating magnetic field in response to supply of current to the coil set. The rotor includes magnetic poles, which oppose the stator in a radial direction from an inside of the stator and are magnetized to different polarities alternately in the circumferential direction. The coil set is formed of a plurality of coils wound about the plurality of tooth parts and a plurality of crossing wires connecting the coils in the circumferential direction. The insulator of the stator is formed of a plurality of ring parts stacked in the axial direction.

In one aspect, the plurality of ring parts has guide projections forming a crossing wire holder part, which holds the crossing wire in the axial direction. At least a part of the crossing wire holder part is formed of a combination of the guide projections of different ring parts.

In another aspect, the plurality of ring parts has guide projections forming a crossing wire holder part, which holds the crossing wire. The crossing wire holder part holds a radially inside part and a radially outside part of the crossing wire by one and the other of the ring parts provided adjacent to each other in the axial direction, respectively.

BRIEF DESCRIPTION OF THE DRAWINGS

The above and other objects, features and advantages of a brushless motor will become more apparent from the following description made with reference to the accompanying drawings. In the drawings:

FIG. 13A, FIG. 13B, FIG. 13C and FIG. 13D are schematic views of crossing wire holder parts in the first embodiment and other examples;

DETAILED DESCRIPTION OF EMBODIMENT

First Embodiment

A brushless motor according to a first embodiment is provided in a fuel pump as shown in FIG. 1 to FIG. 14, particularly in FIG. 1 to FIG. 4.

Figure 1:
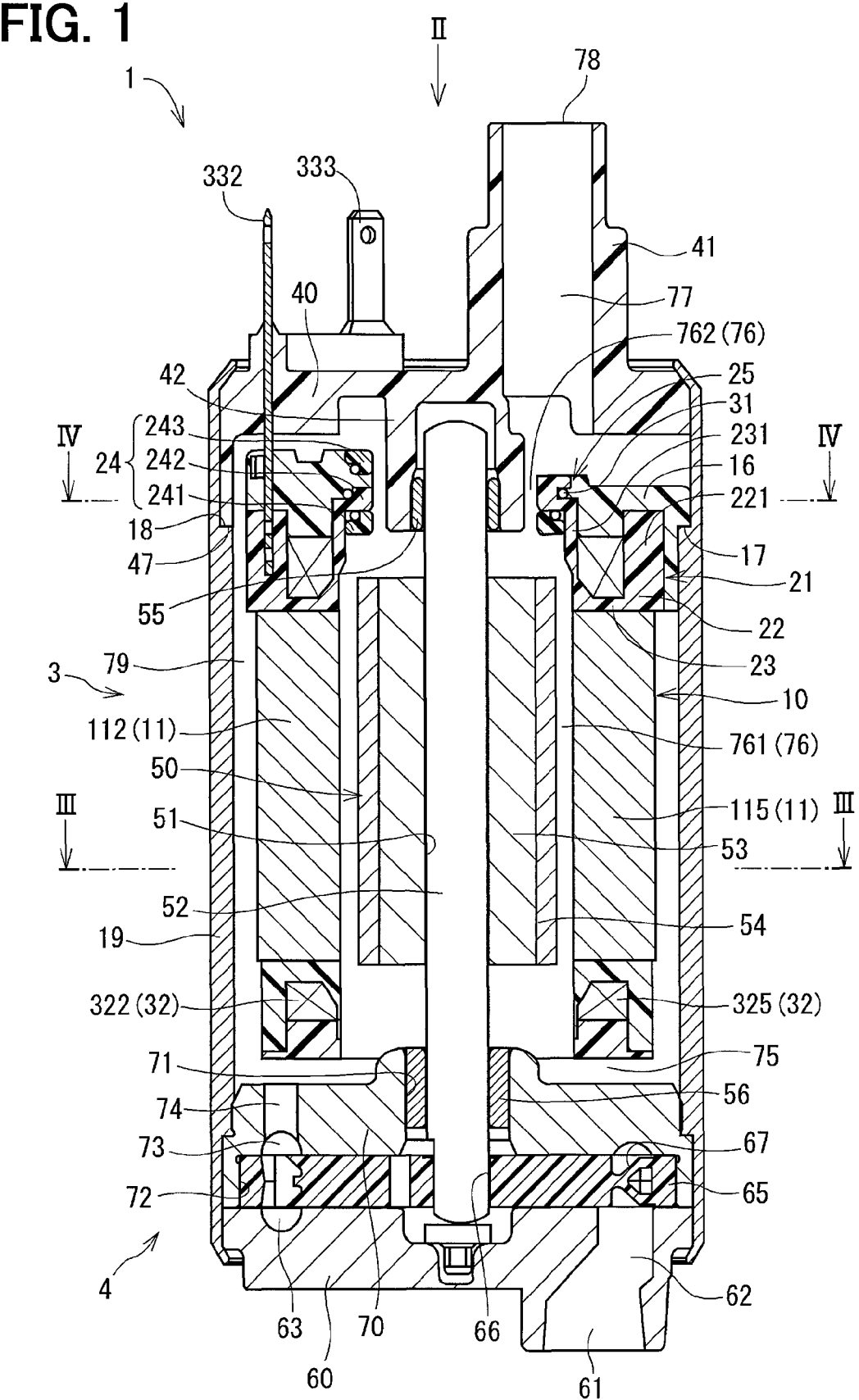
FIG. 1 is a longitudinal sectional view of a fuel pump using a brushless motor according to a first embodiment.
Figure 2:
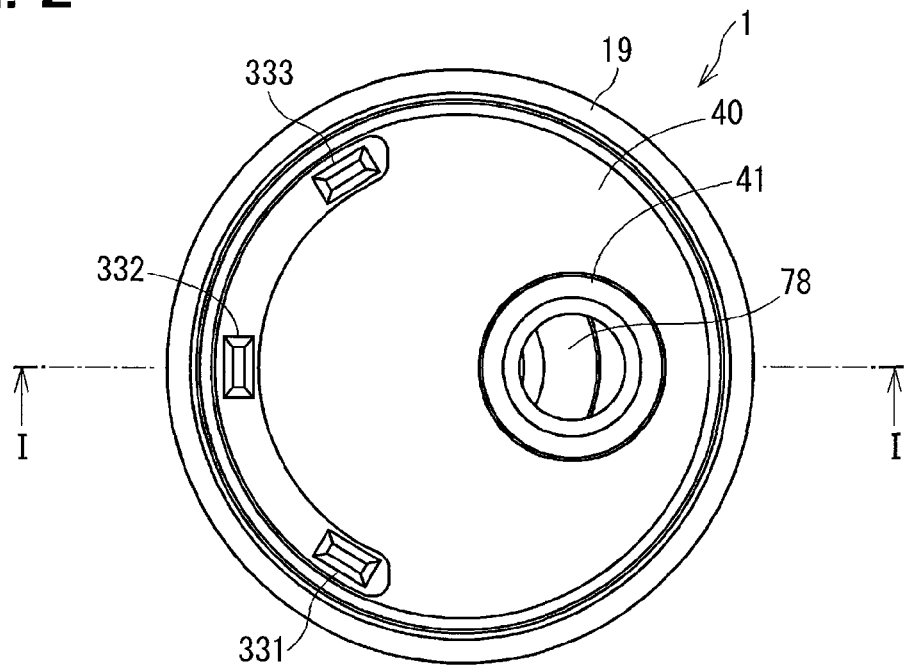
FIG. 2 is a plan view of the fuel pump taken viewed along an arrow II in FIG. 1.

A fuel pump 1 is configured to suction fuel stored in a fuel tank (not shown) from a suction port 61 shown in the lower part of FIG. 1 and discharges it to an internal combustion engine (not shown) from an output port 78 shown in the upper part of FIG. 1. The fuel pump 1 is divided into a motor part 3 and a pump part 4. An outer frame is formed of a housing 19, a pump cover 60, an end cover 40 and the like. In the following description about the fuel pump 1, the upper part and the lower part in FIG. 1 are referred to as a discharge port 78 side and a suction port 61 side.

The housing 19 is made of a metal such as iron and formed in a cylindrical shape. The pump cover 60 closes an end part of the suction port 61 side of the housing 19. The pump cover 60 is crimped into an inside part at a fringe of its end part, which is at the suction port 61 side of the housing 19. The pump cover 60 is thus fixed at an inside part of the housing 19 and prevented from being detached in an axial direction of the housing 19.

Figure 4:
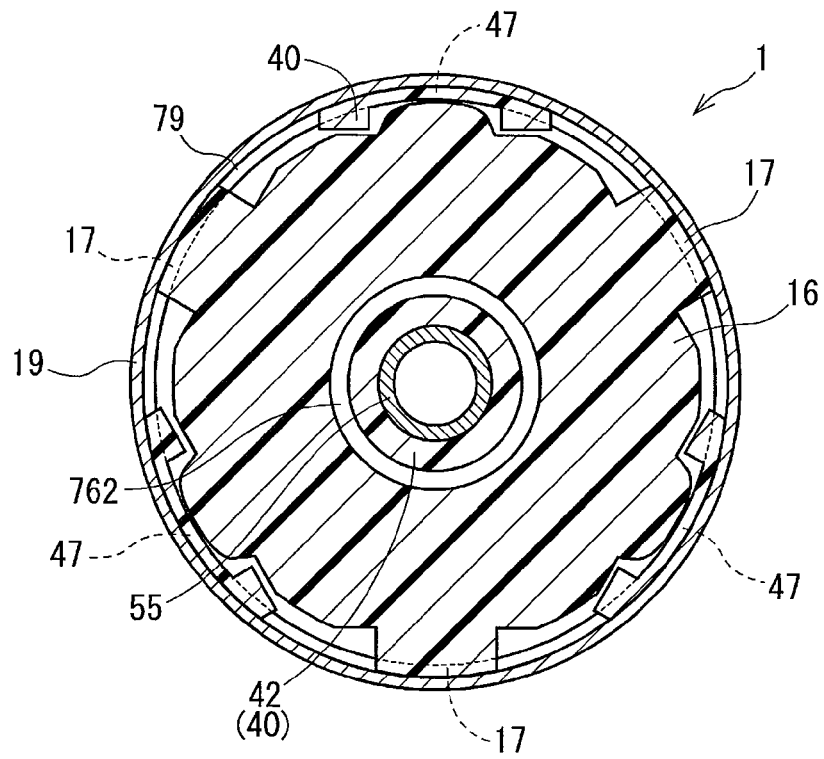
FIG. 4 is a sectional view of the fuel pump taken along a line IV-IV in FIG. 1.

The end cover 40 is made of resin and closes an end part of the discharge port 78 side of the housing 19. The end cover 40 is crimped into an inside part at a fringe of its end part, which is at the discharge port 78 side of the housing 19. The end cover 40 is thus fixed at an inside part of the housing 19 and prevented from being detached in the axial direction. The end cover 40 has a plurality of butting parts 47, which is formed on its outer circumferential peripheral part as shown in FIG. 4. The butting parts 47 rest on a step 18 of the housing 19 to locate the end cover 40 in position relative to the housing 19 in the axial direction.

A cylindrical part 41 is formed at an outside of the end cover 40 to extend in the upward direction in FIG. 1. The discharge port 78 is formed at the end part of the cylindrical part 41. A discharge passage 77 is formed in an inside of the cylindrical part 41 to communicate with the discharge port 78. A cylindrical part 42 is formed on a central axis in the inside of the end cover 40 to extend towards a rotor 50 side in a cylindrical shape. A bearing 55 for the motor part 3 is press-fitted in the inside of the cylindrical part 42.

The motor part 3 is a brushless motor, which includes a stator 10, a rotor 50, a shaft 52 and the like. The stator 10 is formed cylindrically and accommodated inside the housing 19. The stator 10 includes a core 11, an insulator 21, a coil set 30 and terminals 331, 332, 333 and the like. The core 11 is formed of a magnetic material such as iron. The insulator 21 is formed by inserting and resin-molding the core 11 to insulate the coil set 30 and the core 11. An inside surface of the core 11, that is, the surface opposing the rotor 50, is not resin-molded so that a metal surface is exposed. The stator 10 is formed of three combined stator units as will be described below.

The coil set 30 is provided about the insulator 21, in which the core 11 is insert-molded. The insulator 21 holds the core 11 and the coil set 30 while providing insulation therebetween. The coil set 30 is formed of copper wires, for example, a surface of which is covered with an insulating film. The insulator 21, on which the coil set 30 is provided, is resin-molded integrally by a resin mold part 16. The butting part 17 formed on the outer circumferential peripheral part of the resin mold part 16 as shown in FIG. 4 butts the step 18 of the housing 19 so that the stator 10 is located in position relative to the housing 19 in the axial direction. As shown in FIG. 4, the butting part 17 of the stator 10 and the butting part 47 of the end cover 40 are displaced from each other in a circumferential direction.

Figure 3:
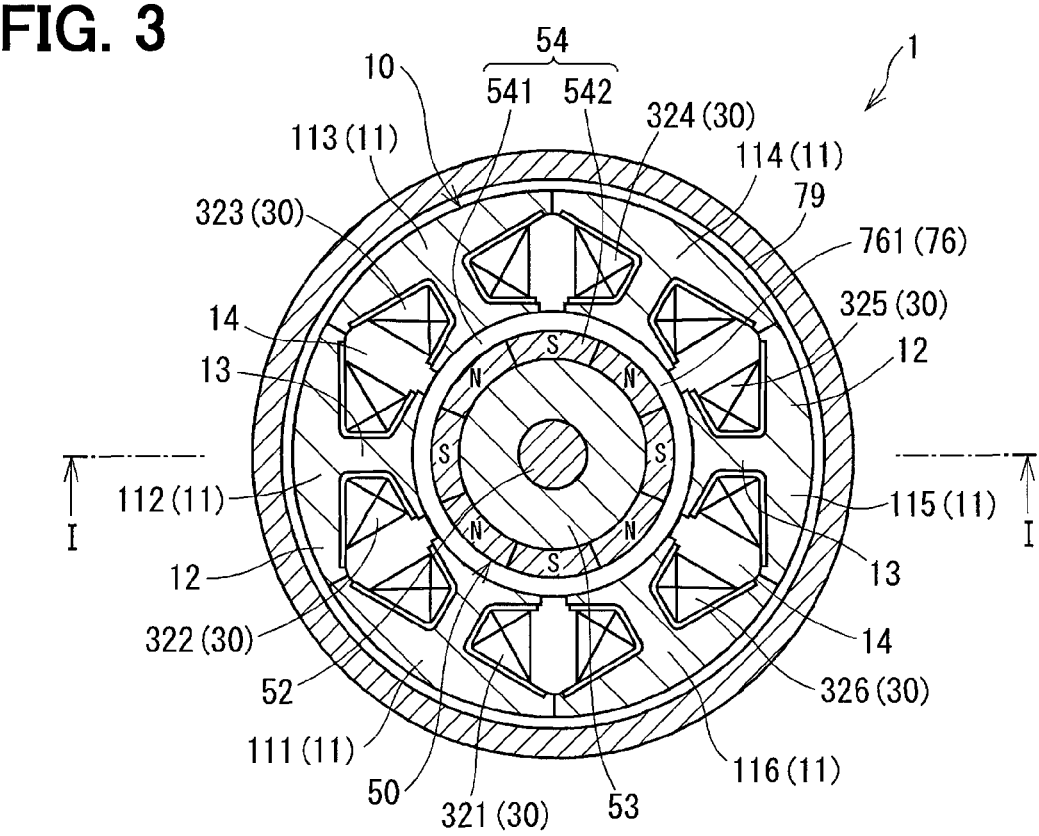
FIG. 3 is a sectional view of the fuel pump taken along a line in FIG. 1.

As shown in FIG. 3, the core 11 is formed of six core pieces 111 to 116. Each of the core pieces 111 to 116 has an annular part 12 and a tooth part 13. The annular part 12 provides an annular outer shape. The tooth part 13 projects from the annular part 12 radially in an inward direction. Six slots 14 are formed to extend in the axial direction in the core 11. Each slot 14 is provided between two adjacent tooth parts 13 of the core pieces 11 to 116.

Figure 5:
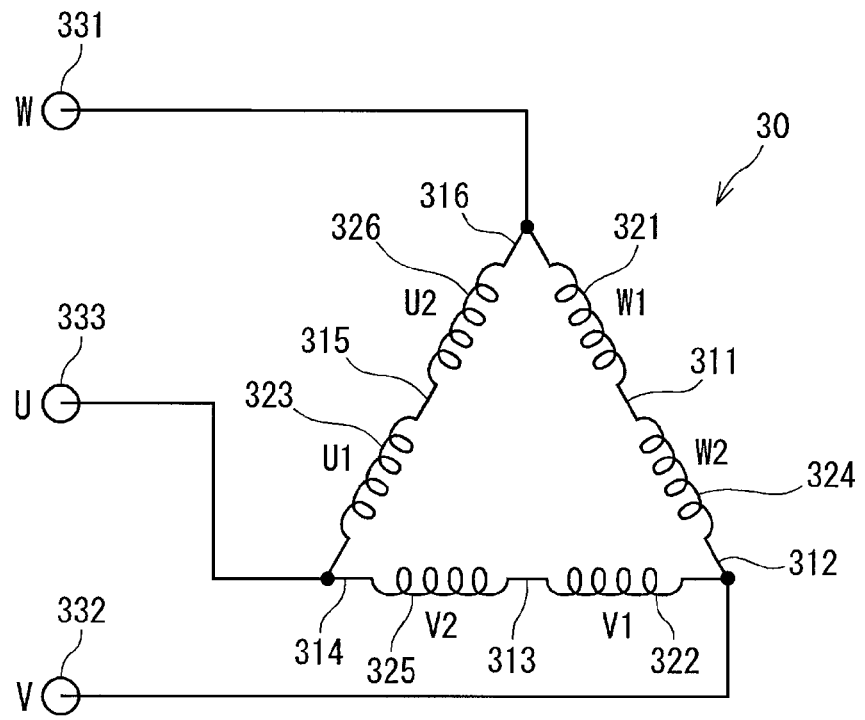
FIG. 5 is an electric wiring diagram of coils of the brushless motor shown in FIG. 1.

Each coil part of the coil set 30 is wound about the tooth part 13 of each core piece 111 to 116 through each slot 14 in a concentrated manner. The coil parts provided on the tooth parts 13 are indicated as coils 321 to 326. The coils 321 to 326 are referred to as a coil 32 collectively and crossing wires 311 to 316 described below are referred to as a crossing wire 31 collectively. The coil set 30 is formed of the coil 32 and the crossing wire 31 as shown in FIG. 5. In FIG. 1, which is a sectional view taken along a line I-I in FIG. 2 and FIG. 3, left half shows a cross section of the core piece 112 wound with the coil 322 and the right half shows a cross section of the core piece 115 wound with the coil 325.

The rotor 50 is accommodated rotatably inside the stator 10. The rotor 50 is provided with magnets 54 on a circumference of an iron core 53. As shown in FIG. 3, the magnets 53 are juxtaposed such that a N-pole 541 and a S-pole 542 are arranged alternately in the circumferential direction. Four pole pairs of the N-pole 541 and the S-pole 542 are provided so that a total of eight poles are provided. Thus, the motor part 3 provides a brushless motor of six slots and eight magnetic poles. This is however one example and the numbers of slots and the magnetic poles are not limited as exemplified above. The shaft 52 is press-inserted into an axial through-hole 51 formed on the central axis of the core 53 to rotate with the rotor 50.

The terminals 331, 332 and 333 are located at positions, which do not interfere with the cylindrical part 41 of the end cover 40 to extend in the axial direction. The terminals 331, 332 and 333 are provided as a W-phase terminal, a V-phase terminal and a U-phase terminal 333, respectively. The coil set 30 of each phase is connected to corresponding one of the terminals 331, 332 and 333, so that three-phase power is supplied to the coil set 30 from a drive circuit (not shown) through the terminals 331, 332 and 333, respectively. With the power supplied to the coil set 30, the stator 10 generates a rotating magnetic field so that the rotor 50 rotates with the shaft 50 in correspondence to the rotating magnetic field.

As shown in FIG. 1, the pump cover 60 has the suction port 61, which is cylindrical and open in the downward direction in FIG. 1. A suction passage 62 is formed inside the suction port 61 to penetrate the pump cover 60 in a plate thickness direction. A pump casing 70 is interposed between the pump cover 60 and the stator 10 in a generally disk shape. A through hole 71 is provided at the central part of the pump casing 70 to penetrate the pump casing 70 in a plate thickness direction. A bearing 56 is press-fitted in the hole of the pump casing 70. The bearing 56 and the bearing 55, which is press-fitted in the end cover 40, jointly supports both axial ends of the shaft 52 rotatably. The rotor 50 and the shaft 52 are thus rotatable relative to the end cover 40 and the pump casing 70.

An impeller 65 is made of resin and formed in a generally disk shape. The impeller 65 is accommodated within a pump chamber 72 provided between the pump cover 60 and the pump casing 70. An end part of the shaft 52 is formed in a D-character shape by cutting a part of the outer wall at the pump chamber 72 side. This end part is fitted in a hole 66, which is formed in a corresponding D-character shape in the central part of the impeller 65. The impeller 65 is thus rotatable in the pump chamber 72 by rotation of the shaft 52.

A groove 63 is formed on a surface of the pump cover 60 at the impeller 65 side to communicate with the suction passage 62. A groove 73 is formed on a surface of the impeller 65 side of the pump casing 70. A passage 74 communicates with the groove 73 to penetrate the pump casing 70 in the plate thickness direction. A vane part 67 is located at a position, which corresponds to the groove 63 and the groove 73.

With electric power supplied to the coil set 30 of the motor part 3, the impeller 65 rotates with the rotor 50 and the shaft 52. The fuel outside the fuel pump 1 is introduced into the groove 63 through the suction port 61. The fuel introduced into the groove 63 is pressurized by rotation of the impeller 65 and led to the groove 73. Fuel in increased pressure flows through the passage 74 and enters into an intermediate chamber 75 at the motor part 3 side of the pump casing 70. The fuel flows form the intermediate chamber 75 to the discharge port 77 through the fuel passage, which longitudinally extends in the motor part 3 and discharges from the discharge port 78.

Two routes of fuel passages are provided as the fuel passage, which longitudinally extends in the motor part 3. A first fuel passage 76 is formed of a passage 761 shown in FIG. 3 and a passage 762 shown in FIG. 4. The passage 761 is provided between an outer wall of the rotor 50 and an inner wall of the stator 10. The passage 762 is provided between an outer wall of a cylindrical part 42 of the end cover 40 and an inner wall of a central ring part 24 of the insulator 21. The second fuel passage 79 extends between an outer wall of the stator 10 and an inner wall of the housing 19. As shown in cross-section in FIG. 4, the second fuel passage 79 extends in the circumferential direction between the butting part 17 of the stator 10 and the butting par 47 of the end cover 40. Since the fuel passages are formed in two routes, pressure loss, which will otherwise be caused when a large amount of fuel flows, can be reduced.

The stator 10 will be described next in more detail with reference to FIG. 5 to FIG. 14.

As shown in FIG. 5, the coil set 30 forming the magnetic circuit of the stator 10 is formed of three-phase coils, which are connected in the delta shape. Two coils are connected in series between both terminals of each phase. Specifically, between the W-phase terminal 331 and the V-phase terminal 332, a W-phase first coil 321, a crossing wire 311, a W-phase second coil 324 and a crossing wire 312 are connected in series in this order. Between the V-phase terminal 332 and the U-phase terminal 333, a V-phase first coil 322, a crossing wire 313, a V-phase second coil 325 and a crossing wire 314 are connected in series in this order. Between the U-phase terminal 333 and the W-phase terminal 331, a U-phase first coil 323, a crossing wire 315, a U-phase second coil 326 and a crossing wire 316 are connected in series in this order.

Figure 6:
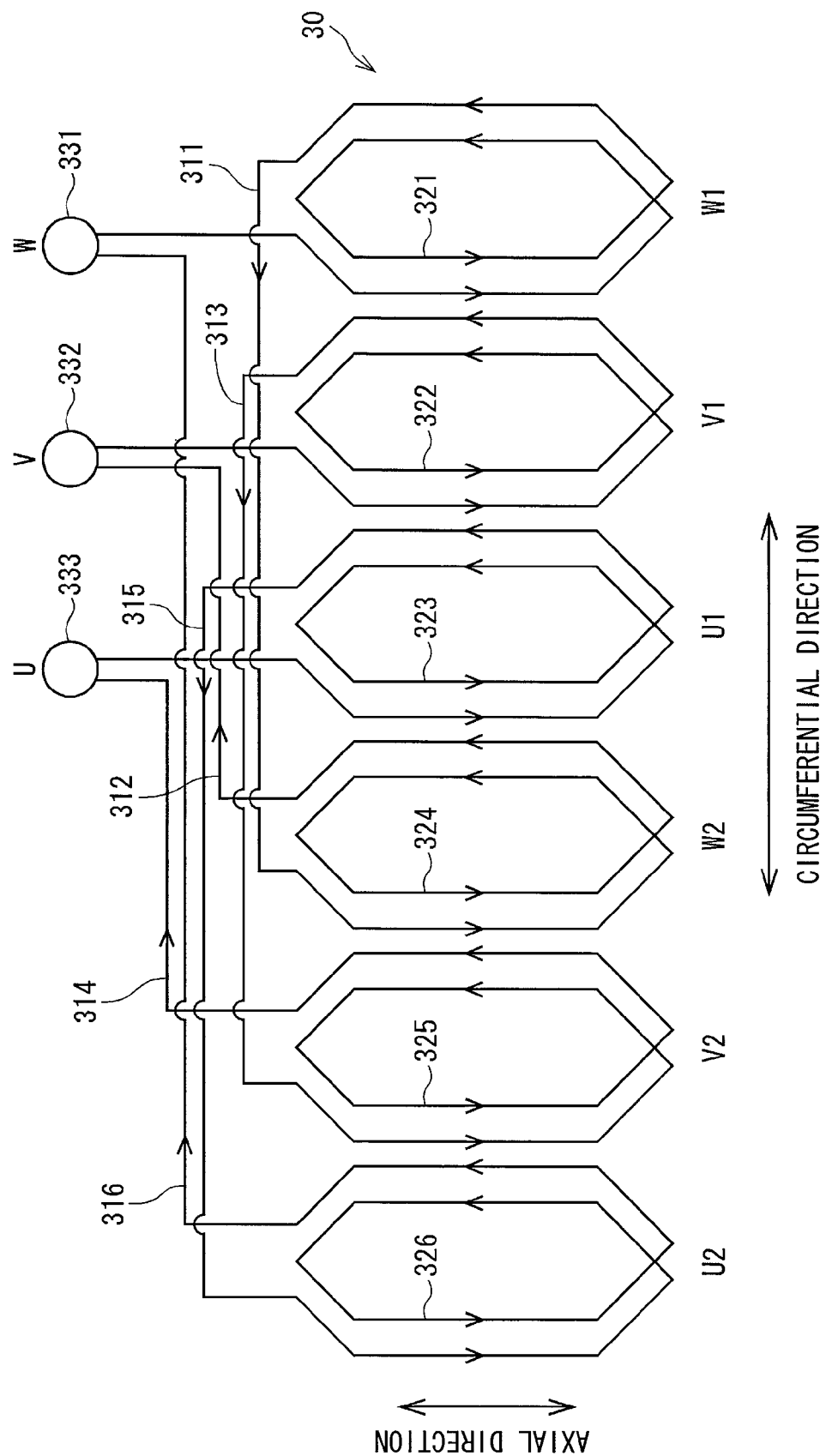
FIG. 6 is an electric wiring diagram of detailed arrangement of coils shown in FIG. 5.

An electric wiring layout of the coils of the coil set 30 shown in FIG. 5 is shown in FIG. 6 in a manner expanded in the axial direction and the circumferential direction of the stator 11. Arrows in FIG. 6 indicate directions of winding of coils. The coil wire is depicted by one continuous line starting from the W-phase terminal 331 and returning to the same terminal 331, for example.

The mechanical configuration of the stator 10 is shown in FIG. 7 to FIG. 14.

Figure 7:
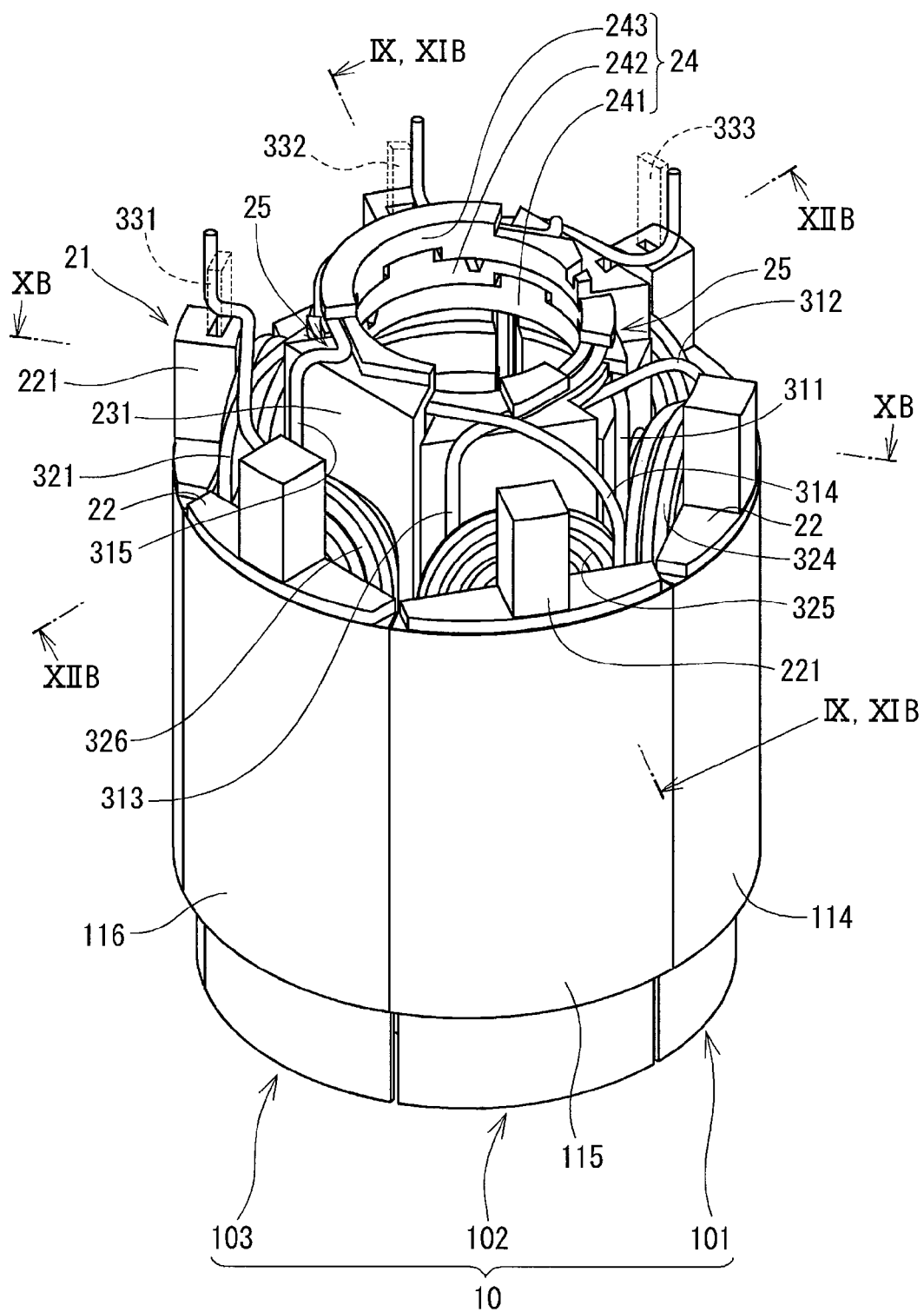
FIG. 7 is a perspective view of a stator, which is before resin-molded, in the first embodiment.
Figure 8:
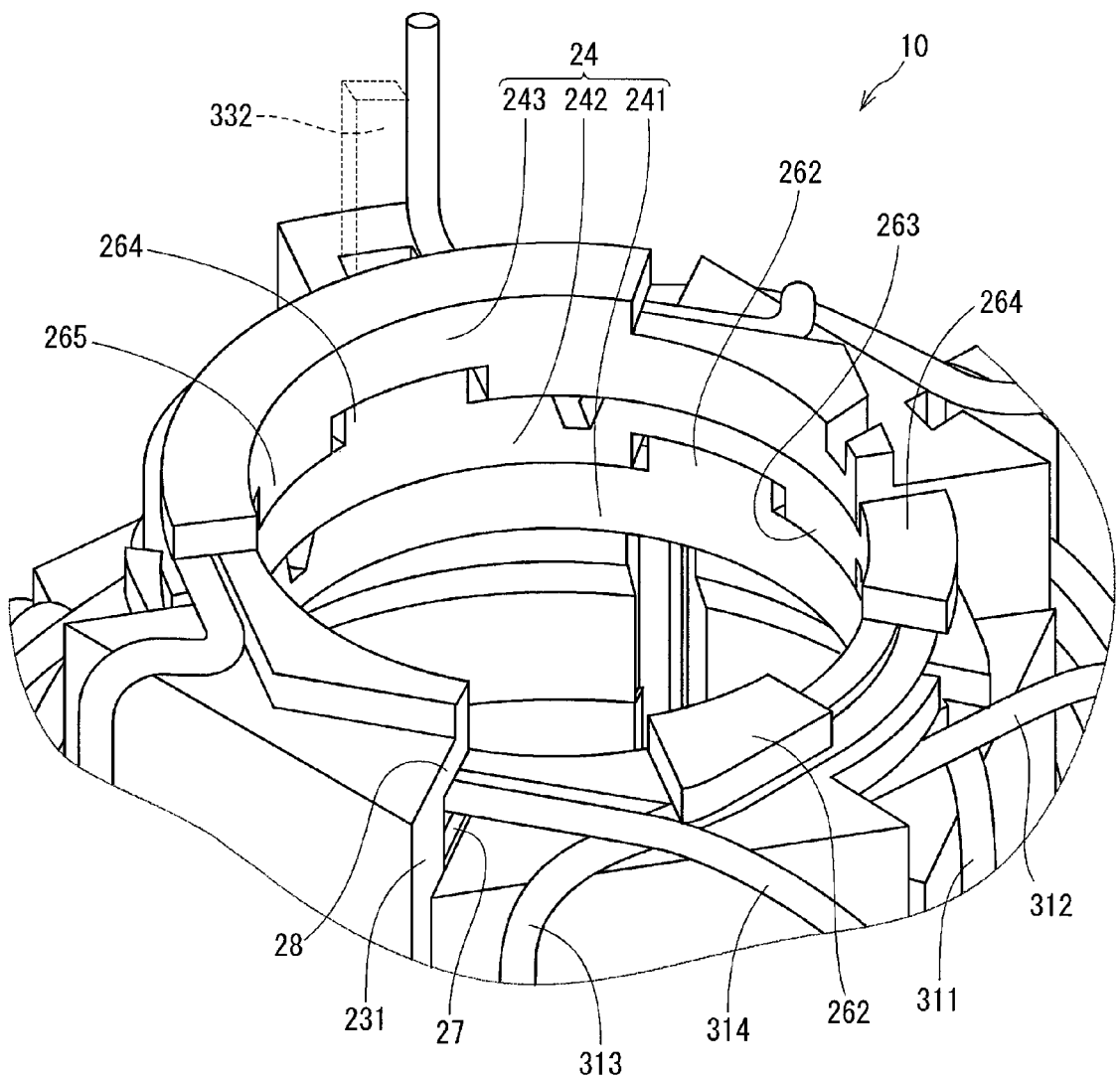
FIG. 8 is an enlarged view of an insulator ring part shown in FIG. 7.
Figure 9:
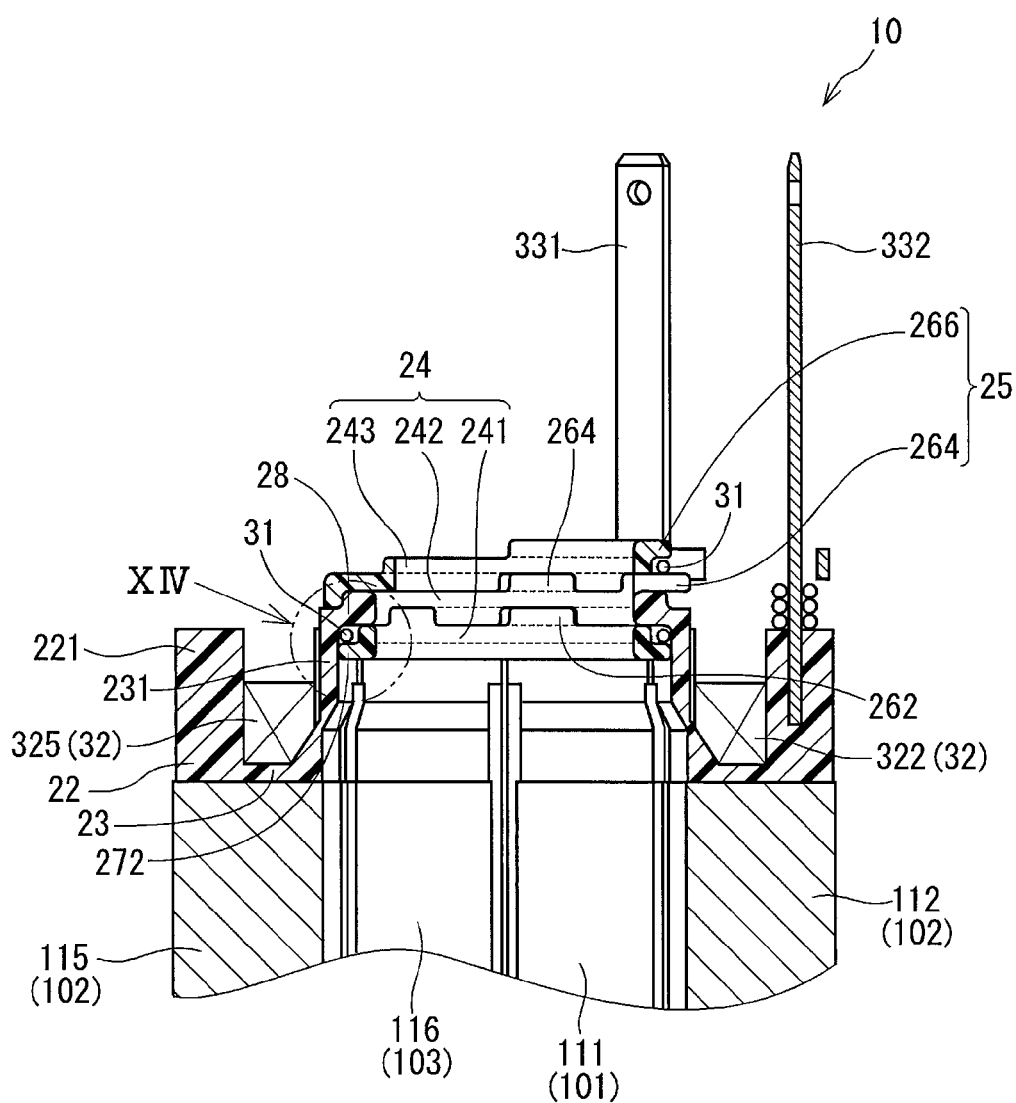
FIG. 9 is a sectional view of a stator unit in an assembled stated, the sectional view being taken along a line IX-IX in FIG. 7.
Figure 10A:
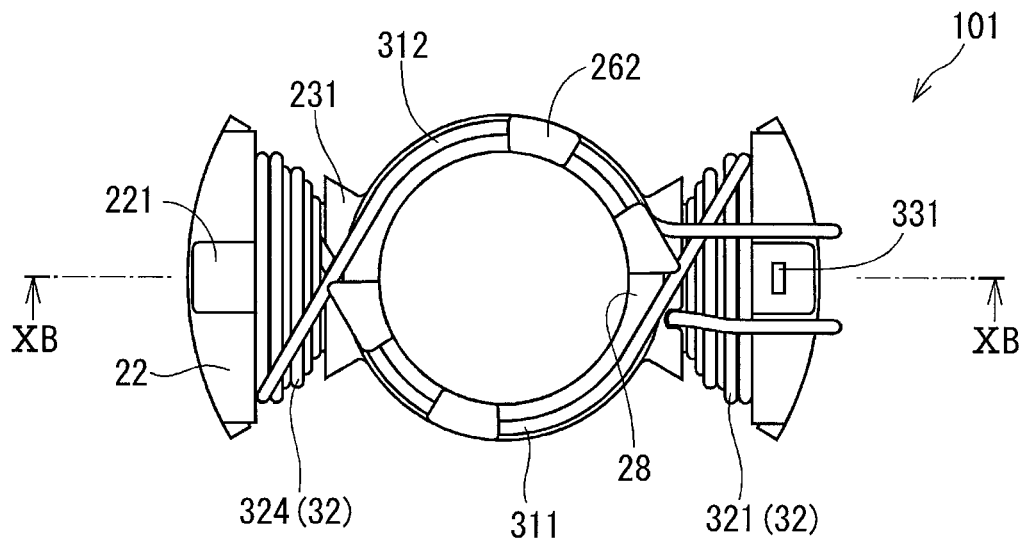
FIG. 10A is a plan view of a W-phase stator unit and FIG. 10B is a sectional view taken along a line XB-XB in FIG. 7.
Figure 10B:
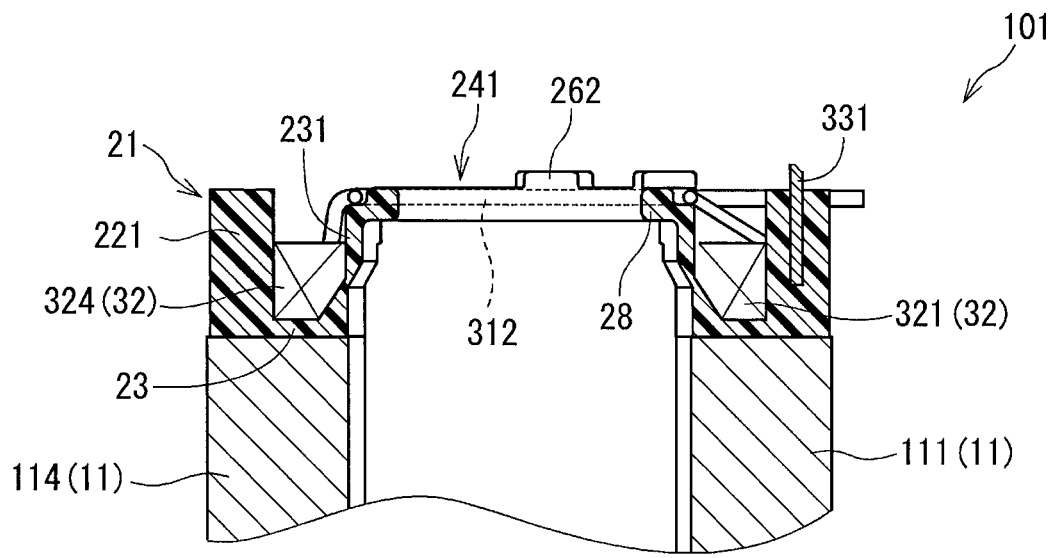

As shown in FIG. 7 to FIG. 9, the stator 10 is formed of an assembly of three stator units 101, 102 and 103. Specifically, as shown in FIGS. 10A, 10B to FIGS. 12A, 12B, the stator unit 101 includes W-phase core pieces 111 and 114. The stator unit 102 includes V-phase core pieces 112 and 115. The stator unit 103 includes U-phase core pieces 113 and 116.

The insulator 21 of each of the stator units 101, 102 and 103 is formed of an annular cover part 22, a tooth cover part 23, a central ring part 24 (241, 242 and 243) and the like. The annular cover part 22 covers the annular part 12 of the core 11. The tooth cover part 23 covers the tooth part 13 of the core 11. The coils 321 to 326 of the coil set 30 are wound about the tooth cover part 23. The crossing wires 311 to 316 are arranged among the coils 321 to 326 to connect the coils in the circumferential direction or connect the coils and the terminals. In FIG. 7 and FIG. 8, only the crossing wires 311 to 316, which are visible are assigned with reference numerals 311 to 314. In the description of the stator units 101, 102 and 103, the upper sides of FIG. 7 to FIG. 14 in the axial direction are referred to as terminal sides and the lower sides of FIG. 7 to FIG. 14 in the axial direction are referred to as counter-terminal sides.

A column part 221 is provided on the annular cover part 22. The column part 221 projects toward the terminal side in the axial direction and guides or limits the winding position of the coil 32 at the radially outside position. A wall part 231 is provided on the tooth cover part 23 to guide or limit the winding position of the coil 32 at the radially inside position. The central ring part 24 is provided inside the core 11 in the radial direction and at the terminal side in the axial direction. The central ring part 24 and the wall part 231 are coupled by the coupling part 28.

The central ring parts 241, 242 and 243 of each insulator are formed to have different heights in the axial direction as shown in detail in FIG. 8. Specifically, the central ring parts 241, 242 and 243 are formed in this order from the low side and stacked to form the assembly of three stator units 241, 242 and 243.

Figure 11A:
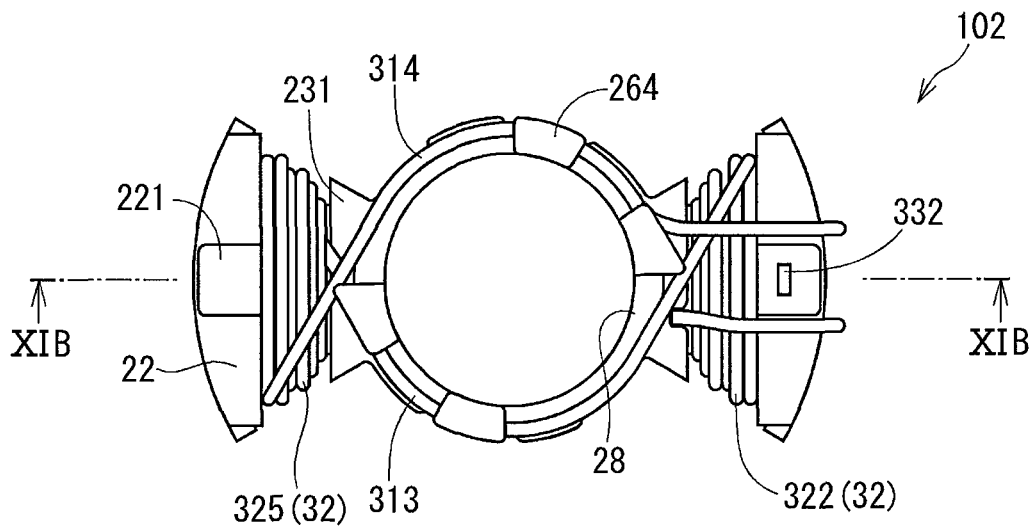
FIG. 11A is a plan view of a V-phase stator unit and FIG. 11B is a sectional view taken along a line XIB-XIB in FIG. 7.
Figure 11B:
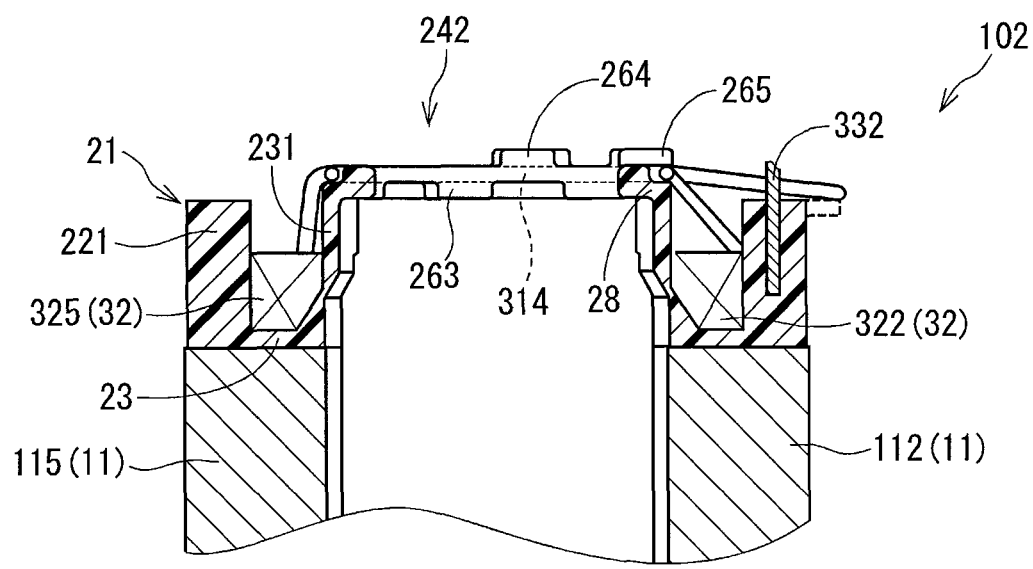
Figure 12A:
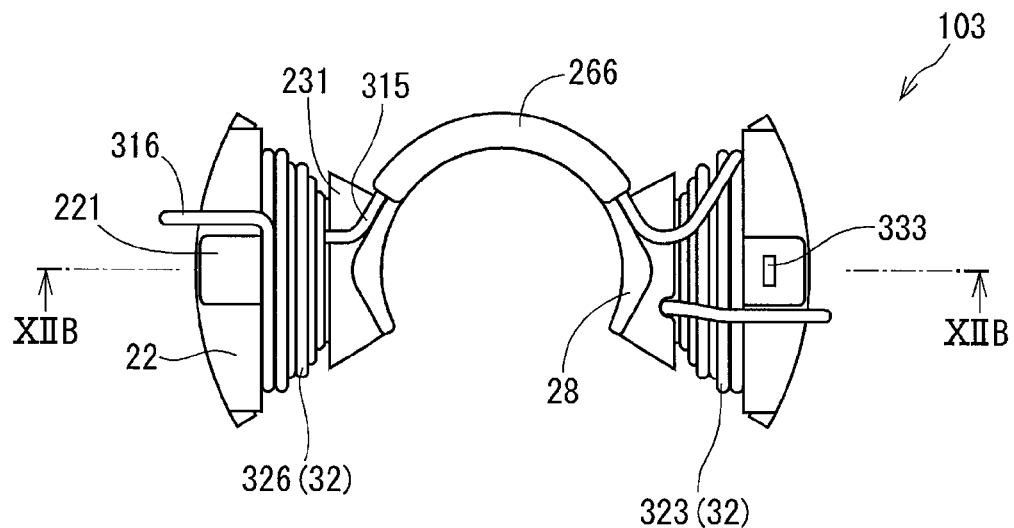
FIG. 12A is a plan view of a U-phase stator unit and FIG. 12B is a sectional view taken along a line XIIB-XIIB in FIG. 7.
Figure 12B:
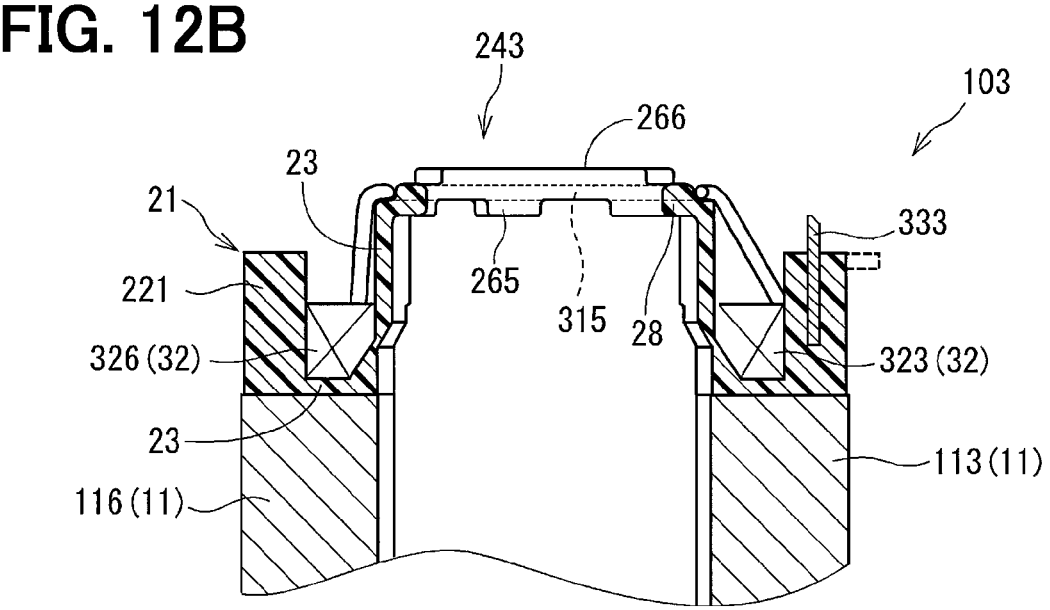

A crossing wire holder part 25 is formed along the outer circumference of the central ring parts 241, 242 and 243 to hold the crossing wire 31 to extend in the circumferential direction. The crossing wire holder part 25 has a plurality of first guide projections formed at the counter-terminal side of the crossing wire 31 and a plurality of second guide projections formed at the terminal side of the crossing wire 31. For example, as shown in FIG. 11B, the crossing wire holder part 25 of the stator unit 102 is formed of a plurality of first guide projections 263 projecting downward and a plurality of second guide projections 264 projecting upward. The first guide projections 263 and the second guide projections 264 are arranged alternately in the circumferential direction. As shown in FIG. 12B, the crossing wire holder part 25 of the stator unit 103 is formed of a plurality of first guide projections 265 and a plurality of second guide projections 266.

Further, as shown in FIG. 9, the guide projections 264 of the stator unit 102 oppose the second guide projections 266 of the stator unit 103 to hold the counter-terminal side of the crossing wire 31 under a state that the stator units 101 to 103 are assembled. Thus at least a part of the crossing wire holder part 25 is formed of a combination of guide projections, which are formed on different stator units.

This configuration is shown in FIG. 13A, which schematically illustrates the arrangement of the guide projection of the crossing wire holder part 25. The first guide projections 263 and the second guide projections 264, which are provided on the stator unit located at the counter-terminal side (lower part in the figure), are arranged alternately in the circumferential direction to hold a crossing wire 317. The first guide projections 265 and the second guide projections 266, which are provided on the stator unit located at the terminal side (upper part in the figure), are arranged alternately in the circumferential direction to hold a crossing wire 318. The crossing wire holder part 25 is formed by the combination of the guide projections 263 and the guide projections 265, which are formed on the different stator units each other, and the combination of the guide projections 264 and the guide projections 266, which are formed on the different stator units each other. The guide projections 263 and the guide projections 265 are arranged at the same circumferential positions. The guide projection 264 and the guide projection 266 are also arranged at the same circumferential positions.

The arrangement shown in FIG. 13A may be modified as shown in FIG. 13B. The arrangement of FIG. 13B is different from that of FIG. 13A in that the guide projections 263 and the guide projections 265, which are formed on the different stator units, are arranged at the different circumferential positions. The guide projections 264 and the guide projections 266 are also arranged at the different circumferential positions. According to the arrangements of FIG. 13A and FIG. 13B, an interval in the axial direction (inter-center distance) H1 between the crossing wire 317 and the crossing wire 318 can be shortened.

In the crossing wire holder part 35 according to a comparative example shown in FIG. 13C, first guide projections 363 and second guide projections 364 formed on the stator unit at the counter-terminal side (lower part in the figure) are arranged to oppose each other and hold only the crossing wire 317. First guide projections 365 and second guide projections 366 formed on the stator unit at the terminal side (upper part in the figure) are arranged to oppose each other and hold only the crossing wire 318. That is, the guide projections for holding the crossing wire 317 and the guide projections for holding the crossing wire 318 are provided completely independently of each other. According to this comparative example, the interval H2 between the crossing wire 317 and the crossing wire 318 becomes longer than the interval H1 in FIG. 13A and FIG. 13B. In another comparative example, in which each of the guide projections 363 to 366 are formed continuously in the circumferential direction as shown in FIG. 13D, the interval H2 is the same as in FIG. 13C.

As described above, according to the first embodiment, the stator 10 is formed by stacking the central ring parts 241 to 243 of the plurality of stator units 101 to 103 in the axial direction. In the stator units 101 to 103, the guide projections are formed to provide the crossing wire holder part 25. At least a part of the crossing wire holder part 25 is formed of a combination of the guide projections, which are respectively formed on the different stator units.

Thus the interval between the crossing wires 31 in the axial direction can be shortened in comparison to the case, in which the crossing wire holder parts 25 for holding the respective crossing wires 31 are formed of the projection formed on the single stator unit. As a result, the length of the motor part 3 in the axial direction, consequently a total length of the fuel pump 1, can be shortened. In addition, the crossing wire holder parts 25 can be formed in balanced manner in the circumferential direction, since the first guide projections and the second guide projections forming the crossing wire holder part of each stator unit are arranged alternately in the circumferential direction.

Figure 14A:
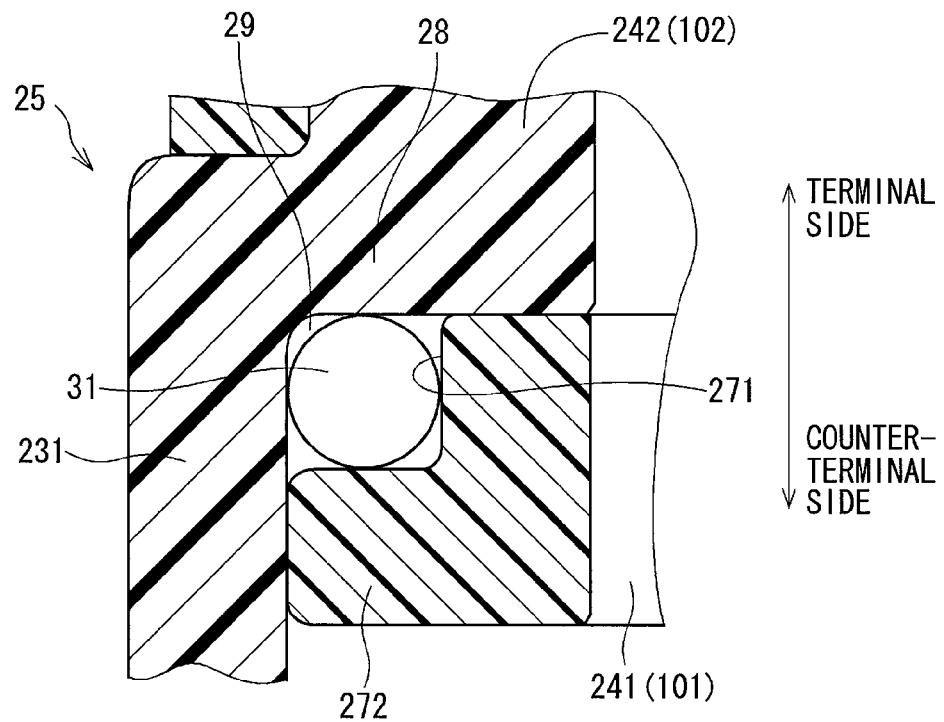
FIG. 14A and FIG. 14B are partially enlarged views of a part XIV in FIG. 9.
Figure 14B:
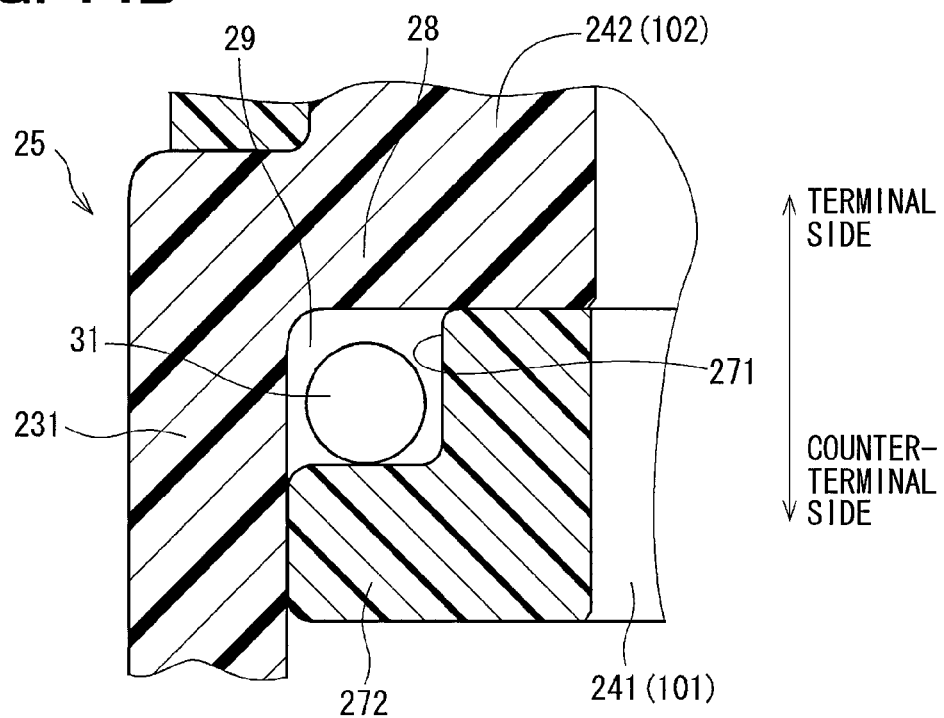

The configuration of the crossing wire holder part 25 in the part XIV in FIG. 9 is shown in FIG. 14A and FIG. 14B. The central ring part 241 is located radially inside the wall part 231 to provide the space 29. The crossing wire 31, particularly its radially inside part, is held by a recess part 271 of the central ring part 241 of the stator unit 101. The recess part 271 is provided at the radially outermost part and defined by a vertical wall surface and a horizontal wall surface. The crossing wire 31, particularly its radially outside part, is held by a wall part 231 of the stator unit 102, which is adjacent to the stator unit 101 in the axial direction. The crossing wire 31, particularly its axially counter-terminal side part, is held by a recess part 272 of the central ring part 241 of the stator unit 101. The crossing wire 31, particularly its axially terminal side part, is held by the coupling part 28 of the stator unit 102, which is adjacent to the stator unit 101 in the axial direction. Thus the crossing wire 31 is held in the space 29 formed between the central ring part 24 and the coupling part 28. The crossing wire 31 is surrounded and sandwiched by two insulation parts in both radial direction and axial direction.

Here, the diameter of the crossing wire 31 may be equal to or a little larger as shown in FIG. 14A or smaller as shown in FIG. 14B than the width and height of the space 29 formed by the recess part 271 and the projection part 272 of the central ring part 241 as well as the wall part 231 and the coupling part 28.

As described above, according to the first embodiment, the central ring parts 241 to 243 of the plurality of stator units 101 to 103 are stacked in the axial direction and hence the crossing wire 31 can be held in both radial direction and axial direction by the axially adjacent stator units. It is thus possible to prevent the crossing wire 31 from dropping out from the crossing wire holder part 25 by injection pressure or the like applied when the resin-mold part 16 is formed later by molding. Damage, short-circuit and the like, which will be caused by dropping-out of the crossing wire 31, can be prevented and thereby reliability can be increased.

Second Embodiment

Figure 15:
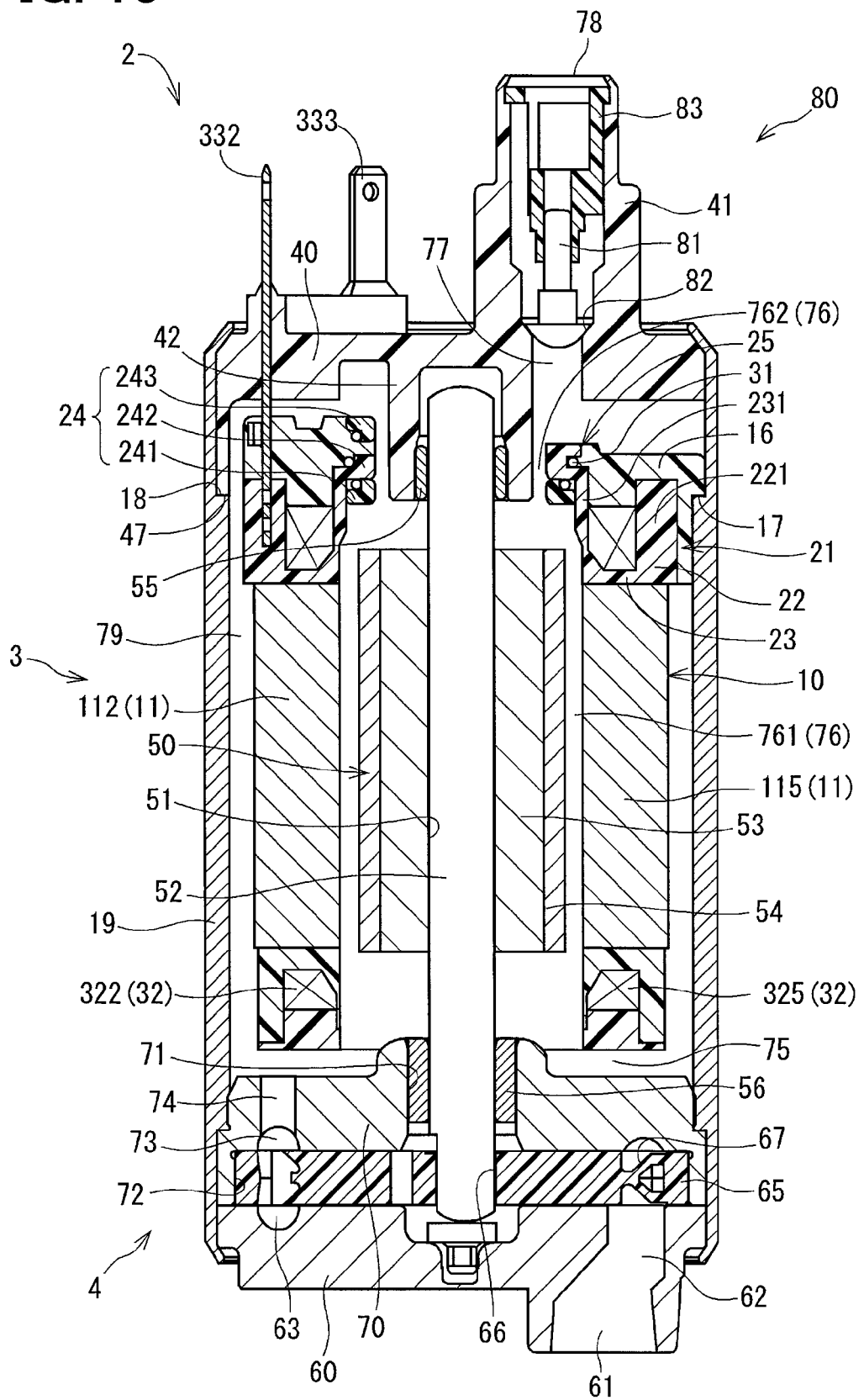
FIG. 15 is a longitudinal sectional view of a fuel pump using a brushless motor according to a second embodiment.

A fuel pump according to a second embodiment is shown in FIG. 15. A fuel pump 2 according to the second embodiment is different from the fuel pump 1 of the first embodiment only in that a check valve part 80 is provided within the discharge passage 77 at a position immediately inside the discharge port 78. Substantially same parts are designated by the same reference numerals to simplify the description.

In the check valve part 80, a rod-shaped valve member 81 and a support member 83 are provided in the discharge passage 77. The support member 83 is fixed to the discharge port 78 side of the discharge passage 77 to support one end part of the valve member 81 slidably. The valve member 81 is thus supported reciprocally in the axial direction in the discharge passage 77. The other end part of the valve member 81 is formed semi-spherically to be able to butt a valve seat 82 formed in an intermediate part of the discharge passage 77.

When the pressure of fuel is boosted by rotation of the impeller 65 and the pressure in the discharge passage 77 rises to a predetermined pressure, the valve member 81 opens the discharge passage 77. The fuel in the discharge passage 77 is thus discharged from the discharge port 78 and then supplied to the internal combustion engine through a passage member (not shown). When the pressure of fuel decreases by reduction or stop of rotation of the impeller 65 and the pressure in the discharge passage 77 becomes lower than that in the passage member leading to the engine, the valve member 81 seats on the valve seat 82 to close the discharge passage 77. Thus the fuel in the passage member is prevented from flowing in reverse to the fuel pump 2. Since the fuel is thus maintained within the passage member when, for example, the internal combustion engine stops, the internal combustion engine can be re-started readily next time.

In the second embodiment, the motor part 3 of the fuel pump 2 is the same as in the first embodiment in respect of the configuration of the stator 10, particularly of the crossing wire holder part 25. The length of the motor part 3 in the axial direction can be shortened. In addition, the crossing wire can be prevented from dropping out from the crossing wire holder part 25.

Other Embodiments (a) In the brushless motor according to the above-described embodiments, the three-phase coils are connected in the delta-shape as exemplified in FIG. 5. However, the three-phase coils may be connected in a star-shape. Further, the motor is not limited to the three-phase motor but may, for example, be a two-phase brushless motor. In a case of the three-phase motor, the terminals, the coils and the like for the U-phase, the V-phase and the W-phase may be laid out differently from the above-described embodiments.

(b) In the above-described embodiments, the crossing wire holder part for each stator unit is formed the plurality of guide projections in different shapes in the circumferential direction as exemplified in FIGS. 10A, 10B to FIGS. 12A and 12B. However, the guide projections may be formed in the same shape in the circumferential direction.

(c) In the above-described embodiments, the stator core is insert-molded in the insulator. However, as other embodiments, the stator core may be assembled to an insulator formed singly.

(d) The configuration other than the stator of the motor part is not limited to the above-described embodiments. For example, the magnetic poles of the rotor need not be provided around the iron core but may be provided by magnetizing the iron core itself.

(e) The brushless motor described above may be used in not only the fuel pump but also other fluid pump or any other devices, which uses rotary drive force.

What is claimed is:

1. A brushless motor comprising:
a stator including a core formed with a plurality of tooth parts arranged in a circumferential direction, a coil set wound on the core, and an insulator holding the core and the coil set while providing insulation therebetween, the stator generating a rotating magnetic field in response to supply of current to the coil set; and
a rotor including magnetic poles, which oppose the stator in a radial direction from an inside of the stator and are magnetized to different polarities alternately in the circumferential direction,
wherein the coil set is formed of a plurality of coils wound about the plurality of tooth parts and a plurality of crossing wires connecting the coils in the circumferential direction,
wherein the insulator of the stator is formed of a plurality of ring parts stacked in the axial direction,
wherein the plurality of ring parts has guide projections forming a crossing wire holder part, which holds the crossing wire in the axial direction,
wherein at least a part of the crossing wire holder part is formed of a combination of the guide projections of different ring parts, and
wherein the plurality of crossing wires is stacked in the axial direction in a manner that the crossing wires and the ring parts are stacked alternately.

2. The brushless motor according to claim 1, wherein:
the plurality of ring parts includes a first guide projection formed on one side of the crossing wire in the axial direction and a second guide projection formed on the other side of the crossing wire in the axial direction; and
the first guide projection and the second guide projection are arranged alternately in the circumferential direction.

3. A brushless motor comprising:
a stator including a core formed with a plurality of tooth parts arranged in a circumferential direction, a coil set wound on the core, and an insulator holding the core and the coil set while providing insulation therebetween, the stator generating a rotating magnetic field in response to supply of current to the coil set; and
a rotor including magnetic poles, which oppose the stator in a radial direction from an inside of the stator and are magnetized to different polarities alternately in the circumferential direction,
wherein the coil set is formed of a plurality of coils wound about the plurality of tooth parts and a plurality of crossing wires connecting the coils in the circumferential direction,
wherein the insulator of the stator is formed of a plurality of ring parts stacked in the axial direction,
wherein the plurality of ring parts has guide projections forming a crossing wire holder part, which holds the crossing wire,
wherein the crossing wire holder part holds a radially inside part and a radially outside part of the crossing wire by one and the other of the ring parts provided adjacent to each other in the axial direction, respectively, and
wherein the plurality of crossing wires is stacked in the axial direction in a manner that the crossing wires and the ring parts are stacked alternately.

4. The brushless motor according to claim 3, wherein:
the insulator has a wall part, a central ring part forming one of the plurality of ring parts and a coupling part coupling the wall part and the central ring part, the wall part guiding from a radially inside part a position of winding the coil to the tooth part; and
wherein the crossing wire holder part holds an axially one side part and an axially other side part of the crossing wire by a projection part formed in another of the ring parts adjacent to the central ring part in the axial direction and by the coupling part.

5. A brushless motor comprising:
a stator including a core and a coil set for generating a rotating magnetic field in response to supply of current, the core including a plurality of tooth parts arranged in a circumferential direction, and the coil set including a plurality of coils wound about the tooth parts and a plurality of crossing wires connecting the plurality of coils in the circumferential direction;
a rotor including magnetic poles opposing the stator in a radial direction and magnetized to different polarities alternately in the circumferential direction for rotation in correspondence to the rotating magnetic field; and
an insulator holding the core and the coil set while providing insulation therebetween at one axial end of the core and including a plurality of parts stacked in the axial direction,
wherein the plurality of parts includes one insulation part and another insulation part, the one insulation part including a wall part extending axially and a ring part extending radially from the wall part, the another insulation part including a ring part provided inside the wall part of the one insulation part to form a space relative to the one insulation part and hold the crossing wires therein to extend in a circumferential direction in a manner surrounded by the one insulation part and the another insulation part, and the plurality of crossing wires is stacked in the axial direction in a manner that the crossing wires and the ring parts are stacked alternately.

* * * * *